United States Patent
Arunasalam et al.

(10) Patent No.: US 9,578,121 B2
(45) Date of Patent: Feb. 21, 2017

(54) APPARATUS AND METHOD FOR CONTROLLING HEATING, COOLING, AND REFRIGERATION SENSOR SYSTEMS UTILIZING THE WIRELESS CLOUD

(71) Applicant: DunAn Microstaq, Inc., Austin, TX (US)

(72) Inventors: Parthiban Arunasalam, Austin, TX (US); Arvind Rao, Austin, TX (US); Wayne Long, Austin, TX (US); Dhaman Besarla, Austin, TX (US)

(73) Assignee: DUNAN MICROSTAQ, INC., Austin, TX (US)

( * ) Notice: Subject to any disclaimer, the term of this patent is extended or adjusted under 35 U.S.C. 154(b) by 284 days.

(21) Appl. No.: 14/049,797

(22) Filed: Oct. 9, 2013

(65) Prior Publication Data
US 2014/0101286 A1 Apr. 10, 2014

Related U.S. Application Data

(60) Provisional application No. 61/711,431, filed on Oct. 9, 2012.

(51) Int. Cl.
*H04L 29/08* (2006.01)
*H04L 12/64* (2006.01)

(52) U.S. Cl.
CPC .......... *H04L 67/28* (2013.01); *H04L 12/6418* (2013.01); *H04L 67/2838* (2013.01)

(58) Field of Classification Search
CPC ... H04L 67/28; H04L 67/2838; H04L 12/6418
See application file for complete search history.

(56) References Cited

U.S. PATENT DOCUMENTS

| | | | |
|---|---|---|---|
| 5,684,463 A | 11/1997 | Diercks et al. | |
| 7,437,150 B1 | 10/2008 | Morelli et al. | |
| 8,594,850 B1 * | 11/2013 | Gourlay | G05B 15/02 165/11.1 |
| 8,630,740 B2 * | 1/2014 | Matsuoka | H04L 12/2825 700/12 |
| 8,800,055 B2 * | 8/2014 | Murakami | G06F 9/5061 713/168 |
| 8,996,141 B1 | 3/2015 | Alsaleem et al. | |
| 2007/0251586 A1 * | 11/2007 | Fuller | F04B 27/1804 137/596.16 |

(Continued)

FOREIGN PATENT DOCUMENTS

WO WO 2013058967 A1 * 4/2013 ......... H04L 12/2825

OTHER PUBLICATIONS

Zein-Sabatto et al. An Intelligent Neuro-Controller Based on System Parameter Estimation. 1996 IEEE. pp. 517-520.*

*Primary Examiner* — Uzma Alam
(74) *Attorney, Agent, or Firm* — MacMillan, Sobanski & Todd, LLC (57) ABSTRACT

A system for controlling one or more structural appliances, such heating, cooling, and ventilation sensor systems utilizing cloud computing architecture, includes at least one intelligent controller, a local intelligent gateway in communication with the intelligent controller, and a cloud computing network in communication with the local intelligent gateway. A local device is operative to communicate through the cloud computing network to the intelligent controller.

25 Claims, 5 Drawing Sheets

(56) References Cited

U.S. PATENT DOCUMENTS

| | | |
|---|---|---|
| 2012/0146791 A1 | 6/2012 | Naidoo et al. |
| 2012/0150775 A1* | 6/2012 | Son .................. G06N 5/04 |
| | | 706/12 |
| 2012/0186019 A1 | 7/2012 | Rawls-Meehan |
| 2013/0024799 A1* | 1/2013 | Fadell ............. G05D 23/1902 |
| | | 715/771 |
| 2013/0086245 A1* | 4/2013 | Lu .................. G05B 13/02 |
| | | 709/223 |
| 2013/0243032 A1 | 9/2013 | Arunasalam et al. |

* cited by examiner

APPARATUS AND METHOD FOR CONTROLLING HEATING, COOLING, AND REFRIGERATION SENSOR SYSTEMS UTILIZING THE WIRELESS CLOUD

CROSS-REFERENCE TO RELATED APPLICATIONS

This application claims the benefit of U.S. Provisional Application No. 61/711,431, filed Oct. 9, 2012, the disclosure of which is incorporated herein by reference.

BACKGROUND OF THE INVENTION

This invention relates in general to the control of heating, cooling, and refrigeration sensor systems. In particular, this invention relates to an apparatus and method for controlling such a heating, cooling, and/or refrigeration electronic expansion valve and sensor system utilizing cloud computing architecture.

It is known to remotely control the operation of one or more structural appliances, such as heating, cooling, and refrigeration electronic expansion valve and/or sensor systems. One known method includes the steps of (1) communicating between a structural appliance and a server that is programmed to accept mobile device commands; (2) communicating between a mobile device and the server; (3) issuing mobile device commands from the mobile device to the server; (4) converting the mobile device commands to structural appliance commands; and (5) issuing the structural appliance commands from the server to the structural appliance. In this manner, wireless control of the structural appliance can be established.

It would desirable to provide an improved apparatus and method for controlling one or more structural appliances, such heating, cooling, and/or refrigeration electronic expansion valve and sensor systems utilizing cloud computing architecture.

SUMMARY OF THE INVENTION

This invention relates to an improved apparatus for controlling one or more structural appliances, such heating, cooling, and/or refrigeration electronic expansion valve and sensor systems utilizing cloud computing architecture. The apparatus includes at least one component controller and a local intelligent gateway that are in communication with each other. A cloud computing network communicates with both the local intelligent gateway and a local device that is in communication with the cloud computing network. The local device communicates through the cloud computing network to the component controller.

This invention also relates to a method for operating such an apparatus that includes entering an instruction for of the system into the local device. The instruction is then transferred from the local device to the cloud computing network. Finally, the instruction is transferred from the cloud computing network to the component controller.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

As will be explained in detail below, this invention provides a wireless cloud computing architecture solution for the control of heating, cooling, and/or refrigeration electronic expansion valve and sensor systems. Generally speaking, the term "cloud computing" refers to the use of computing resources, such as hardware and software, that are delivered as a service over a network (which can, for example, be embodied as the internet). End users can access cloud-based applications through a web browser and/or a specific graphic-user-interface (or other) application provided on a light-weight desktop or a mobile computing device, while the application software and user data can be stored on servers at a remote location. Cloud computing relies on sharing of resources to achieve coherence and economies of scale over a network, similar to an electrical grid of a utility. Thus, cloud computing allows individuals and enterprises to get applications up and running faster with improved manageability and less maintenance. Cloud computing also enables information technology systems to more rapidly adjust resources to meet fluctuating and unpredictable business demand.

Figure 1:
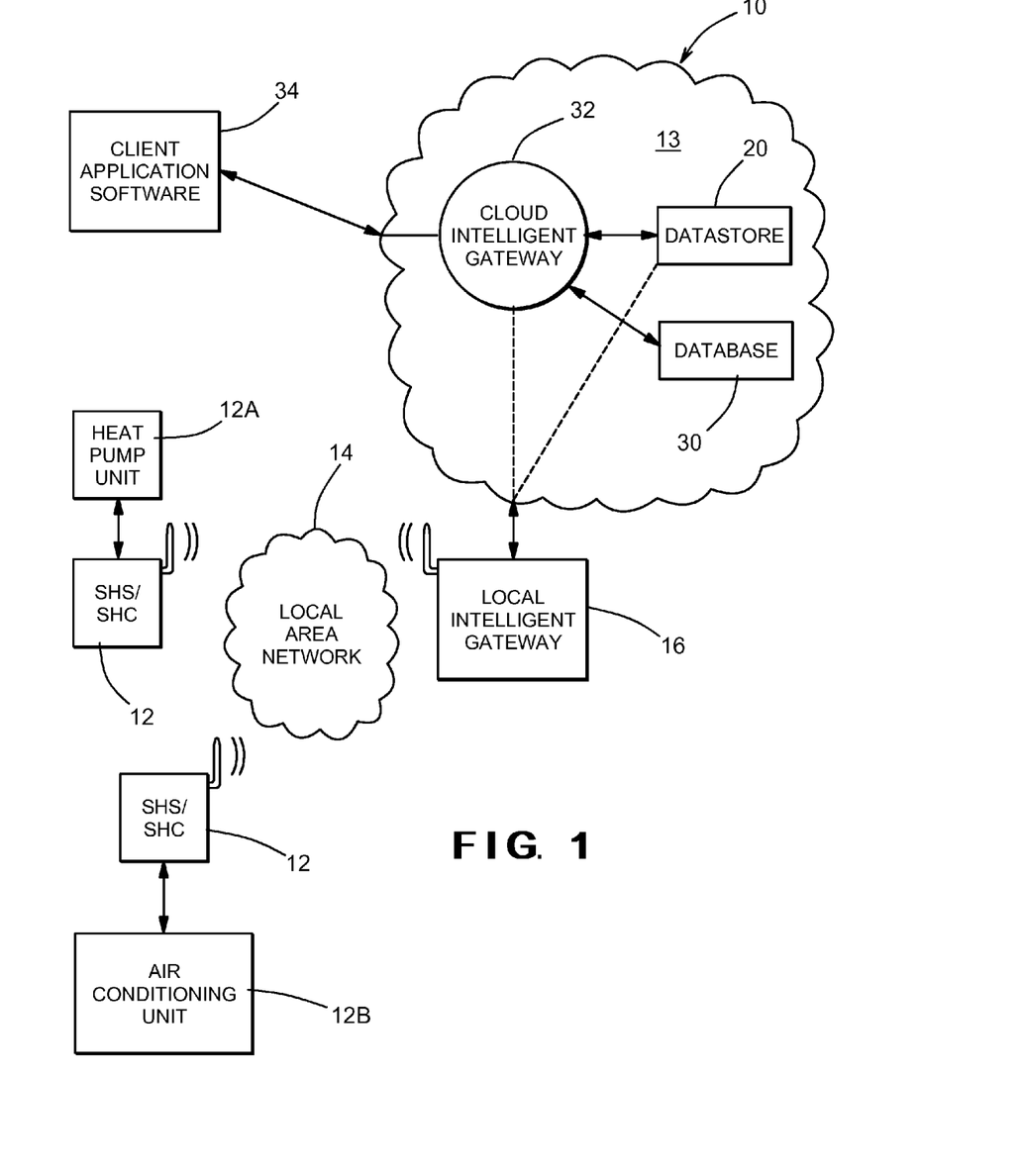
FIG. 1 is a diagrammatic view of a first embodiment of a control apparatus in accordance with this invention.

Referring now to the drawings, there is illustrated in FIG. 1 a diagrammatic view of a first embodiment of a control apparatus, indicated generally at 10, in accordance with this invention. The control apparatus 10 includes one or more intelligent controllers 12 that can wirelessly send and receive information to a cloud computing network or cloud infrastructure 13 through a local area network 14 and a local intelligent gateway 16. The intelligent controllers 12 may, as shown in FIG. 1, be associated with and control one or more conventional heating, ventilating, air conditioning, or refrigeration (HVAC/Refrigeration, or HVAC/R) components such as, for example, a heat pump unit 12A and an air conditioning unit 12B. The local intelligent gateway 16 collects information from one or more of these intelligent controllers 12 (by means of the local area network 14) and stores such information in a structured format in one or more databases, illustrated in FIGS. 1, 4, and 5 as a datastore 20 and database 30 that may, as shown in FIG. 1, be provided within the cloud infrastructure 13 for easy analysis, although such is not required. While the local intelligent gateway 16 is illustrated in FIG. 1 as communicating with only a single one of the databases 20 and 30, it will be appreciated that the local intelligent gateway 16 may alternatively communicate with both (or more) of such databases 20 and 30, which can either provided within the cloud infrastructure 13 or elsewhere as desired.

The local intelligent gateway 16 may also communicate with a cloud intelligent gateway 32 that, in turn, communicates with the databases 20 and 30. As with typical cloud architecture, the databases 20 and 30 may be shared with a plurality of users. Similarly, the cloud intelligent gateway 32 may be shared with a plurality of users. The local intelligent gateway 16 communicates with the cloud infrastructure 13. The control system 10 utilizes client application software that has the ability to communicate with the intelligent controllers 12 (in a manner that is governed by policies based on the application) and retrieve information from the cloud infrastructure 13.

The control system 10 further includes client application software 34 that can, for example, be application-specific software for the particular end application. For example, the client application software 34 may be embodied as an environmental management system provided within a commercial location. The client application software 34 has the ability to communicate with the cloud infrastructure 13 and to send and receive relevant information. The client application software 34 may be installed on any desired local device such as a laptop computer, a desktop computer, a tablet computing device, or other mobile or stationary device (not shown).

The datastore 20 can, for example, be used to store raw data, while the database 30 can be used to store the data in a structured format. Cloud instances can serve unique roles, such as one instance running a database query service and reporting the query output. The cloud infrastructure 13 also includes the cloud intelligent gateway 32 running in the cloud infrastructure 13 that can perform a variety of functions, including (1) communicating with the databases 20 and 30 and retrieve pertinent information; (2) communicating with the end intelligent HVAC/R components such as, the heat pump unit 12A and the air conditioning unit 12B, through the local area network 14 to query the health of the HVAC/Refrigeration system and rectify the health of the system if need be; (3) communicate with each other through the cloud intelligent gateway 32; and (4) provide a gateway for end-user applications that would communicate to the intelligent devices for various services such as monitoring, generating reports, and remotely controlling the intelligent controllers 12. Additionally, cloud instances can communicate with each other through the cloud intelligent gateway 32 and directly with the cloud intelligent gateway 32.

The local intelligent gateway 16 can perform a variety of functions, including (1) running an application to send structured data to the cloud storage units 20 and 30; (2) communicating with the intelligent controllers 12 through wireless interfaces such as Wi-Fi, Bluetooth, Zigbee, cellular modems, RFIDs, and the like; (3) understanding instructions and policies to communicate with intelligent controllers 12; and (4) communicating with the cloud intelligent gateway 32. Additionally, when the cloud network is down, the local intelligent gateway 16 will store data locally (journaling) and then upload data to the cloud infrastructure 13 once the connectivity is available.

Figure 2:
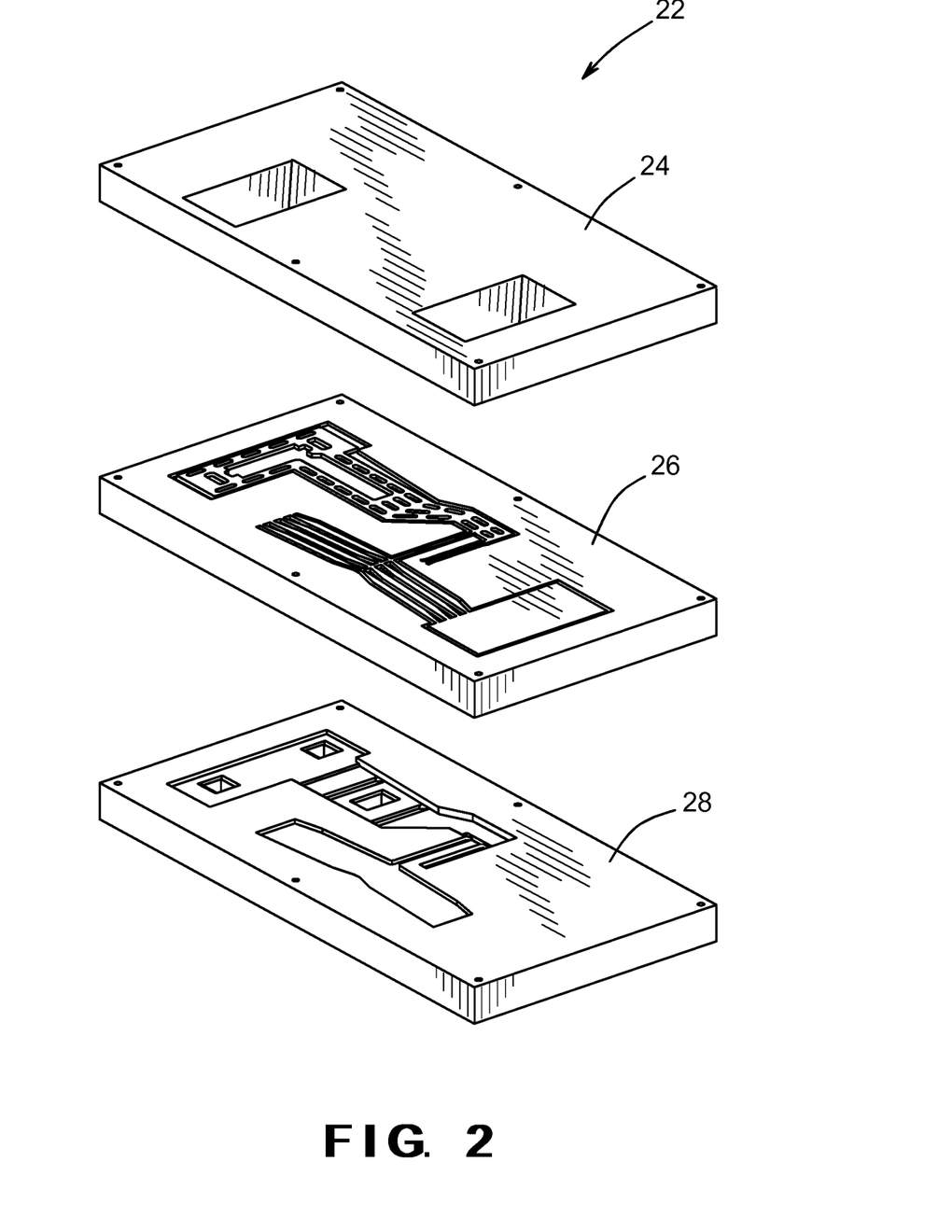
FIG. 2 is an exploded perspective view of a first type of controller that can be utilized in the first embodiment of the control system shown in FIG. 1.

FIG. 2 is an exploded perspective view of a first type of controller, indicated generally at 22, that can be utilized in the control system shown in FIG. 1. For example, each of the intelligent controllers 12 may include the illustrated microvalve 22, which may, for example, be embodied as a Ventilum™ microvalve, which is commercially available from DunAn Microstaq of Austin, Tex. The microvalve 22 can utilize micro-electro-mechanical systems design and process techniques and can leverage the highly accurate and repeatable tunability of silicon wafer resistivity. Such a microvalve 22 can be actuated by applying electrical current to one of three silicon layers, which generates heat as a result of the resistance to the flow of such electrical current therethrough. The heat generated by the resistivity of the silicon material causes thermal expansion of the silicon material that, in turn, provides both force and mechanical motion to open and close a valve. The heating (and, therefore, the movement of the silicon material of the microvalve 22) can be controlled very precisely. As a result, the linearity of motion of the microvalve 22 may be limited only by how precisely the application of the electrical current can be controlled.

The basic structure of the illustrated microvalve 22 is illustrated in FIG. 2. As shown therein, the microvalve 22 has a three layer, sliding plate, silicon valve construction including a top layer 24, a center layer 26, and a bottom layer 28. The top silicon layer 24 includes electrical interconnection interface "ports" and also serves as an upper cover to a sliding plate mechanism. The center layer 26 includes a thermal actuator and a sliding plate mechanism. The bottom layer 28 includes flow ports and also serves as a lower cover to the sliding plate mechanism. In a manner that is well known in the art, the thermal actuator of the center layer 26 moves the sliding plate over the fixed position ports in the bottom layer 28, thus causing operation the microvalve 22.

The microvalve 22 may be embodied as either a direct-acting type or a pilot-spool type. Typically, the direct-acting type of microvalve 22 includes three ports, namely, a first port that is normally open, a second port that is normally closed, and a third port that functions as a common port. When no electrical power is applied to the microvalve 22, fluid can enter the microvalve 22 from either the normally open or the normally closed port and exit the microvalve 22 through the common port. The pilot-spool type of microvalve 22 is also standard in a normally-actuated valve configuration. The spool valve is a hydraulically actuated slave valve that amplifies the flow capacity of the thermally actuated direct-acting microvalve 22. The standard spool valve design typically consists of a two-port main flow valve and a command and feedback port system, through which the direct-acting valve controls the spool valve movements. The pilot-spool type of microvalve 22 can be configured so it mimics the linear movements of the direct-acting type of microvalve 22. In a different configuration, the pilot-spool type of microvalve 22 precisely matches outgoing pressure to the incoming pressure signal. The direct-acting type of microvalve 22 provides the hydraulic "signal" to the spool valve. However, it will be appreciated that this invention may be practiced with other types of control and monitoring devices.

The microvalve 22 can be connected to conventional wireless components for receiving and sending signals (not shown). For example, as shown in FIG. 1, each of the intelligent controllers 12 may include both microvalve and wireless components.

The intelligent controllers 12 of this invention can provide a variety of functions. For example, the intelligent controllers 12 of this invention can (1) raise (i.e., improve) and monitor the system health of the heating/cooling/refrigeration unit; (2) provide an intelligent monitoring system from the cloud network for the purpose of sensing the system health and sending actions to rectify the heating/cooling unit automatically; (3) provide automatic services to the end user, such as reports about system health/system performance; history of actions taken; automatically provide ease-of-use billing services that can be accessed on any computer/handheld device; (4) communicate wirelessly through standard wireless access methods (including, for example, Wi-Fi, Zigbee, cellular modems, Bluetooth, RFID, spread spectrum); (5) respond to a variety of policies sent from service providers and adapt the software accordingly; and (6) control a silicon expansion valve, such as the one shown in FIG. 2, for heating, cooling, and sensor applications.

By using the microvalve 22 with the intelligent controllers 12, this invention has the unique capability of delivering the health of the heating/cooling/refrigeration applications almost instantaneously. In addition, home/office/store/home owners can chose to allow the sensor to dump the system performance data to an open source cloud that enables higher learning institutions and private institutions to run remote data analysis on the overall heating, cooling, and refrigeration system performance within community, municipality, or even a whole city. The data in turn can be utilized to advise home owners, store, owners, utilities, and governments agencies more accurately on the utilization of the systems. By wirelessly networking the sensors, utility and end users can have access to vast amount of data for closely monitoring trends of systems performance.

Thus, this invention provides a unique plug-and-play solution that can be used by end-users/service providers to handle local systems. The solution is flexible so that different users can be configured to access different types of heating/cooling sub-systems based on various configuration settings. This invention also provides a unique solution that will be able to provide various policies to various configurations to handle specific cases. For example, a heating/cooling/refrigeration maintenance company in a particular location can download a policy to handle projects in a particular residential area. Similarly, another consulting firm will download another policy to handle projects in an office building. All of this intelligence will be handled by invention's unique solution as a cloud service that can communicate with cloud intelligent gateway 32 in the cloud infrastructure 13 described above and illustrated by the architectures herein. Additionally, the control system 10 of this invention can be used to update the software that is used in the intelligent controllers 12 and/or other devices.

Figure 3:
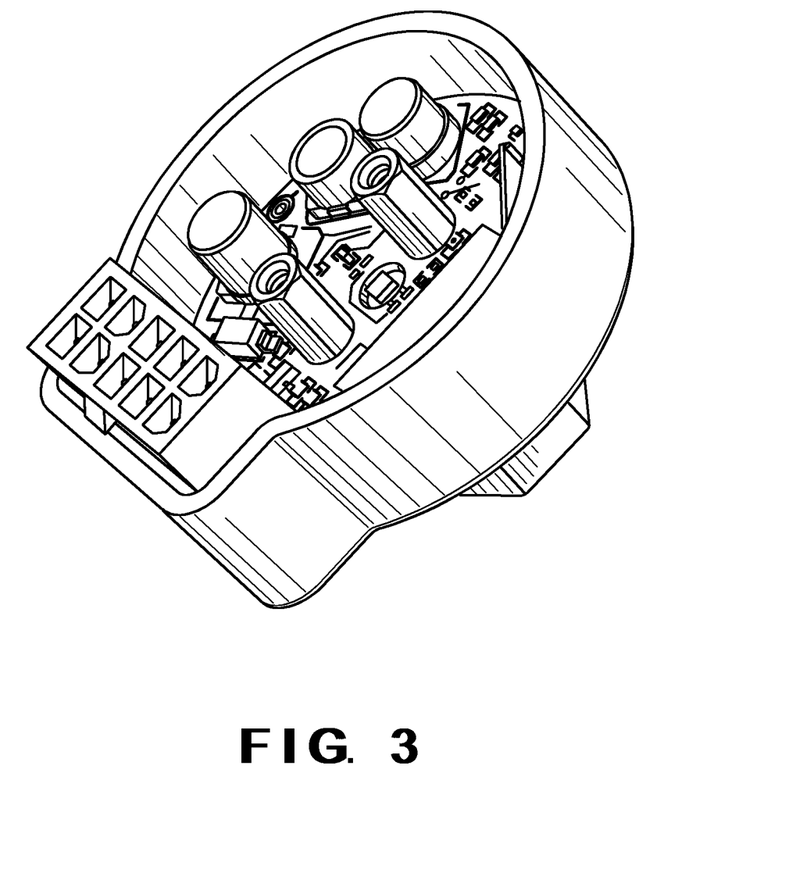
FIG. 3 is a perspective view of a second type of controller that can be utilized in the first embodiment of the control system shown in FIG. 1.

FIG. 3 is an exploded perspective view of a second type of controller, indicated generally at 22', that can be utilized in the control system 10 shown in FIG. 1. For example, each of the intelligent controllers 12 may include the illustrated microvalve 22', which may, for example, be embodied as a SuperHeat Controller, which is also commercially available from DunAn Microstaq of Austin, Tex.

A second embodiment 40 of the invention is illustrated in FIG. 3, wherein like reference numbers are used to indicate components that are similar to those described and illustrated in connection with the first embodiment 10 of this invention. The second embodiment 40 includes a pair of home gateway and storage units (GSUs) 42 and 44, each of which includes software intelligent enough to converse with the intelligent controllers 12, as well as the cloud infrastructure 13, when a connection is available. The home gateway and storage units 42 and 44 are provided in lieu of the local area network 14 and the local intelligent gateway illustrated in FIG. 1. Thus, the second embodiment 40 accommodates a home environment where there can be circumstances during which the wireless connection is not available all the time. While the second embodiment 40 is described and illustrated as having two GSUs 42 and 44, it will be appreciated that the invention also may practiced with a greater or lesser number of such GSUs 42 and 44.

Figure 4:
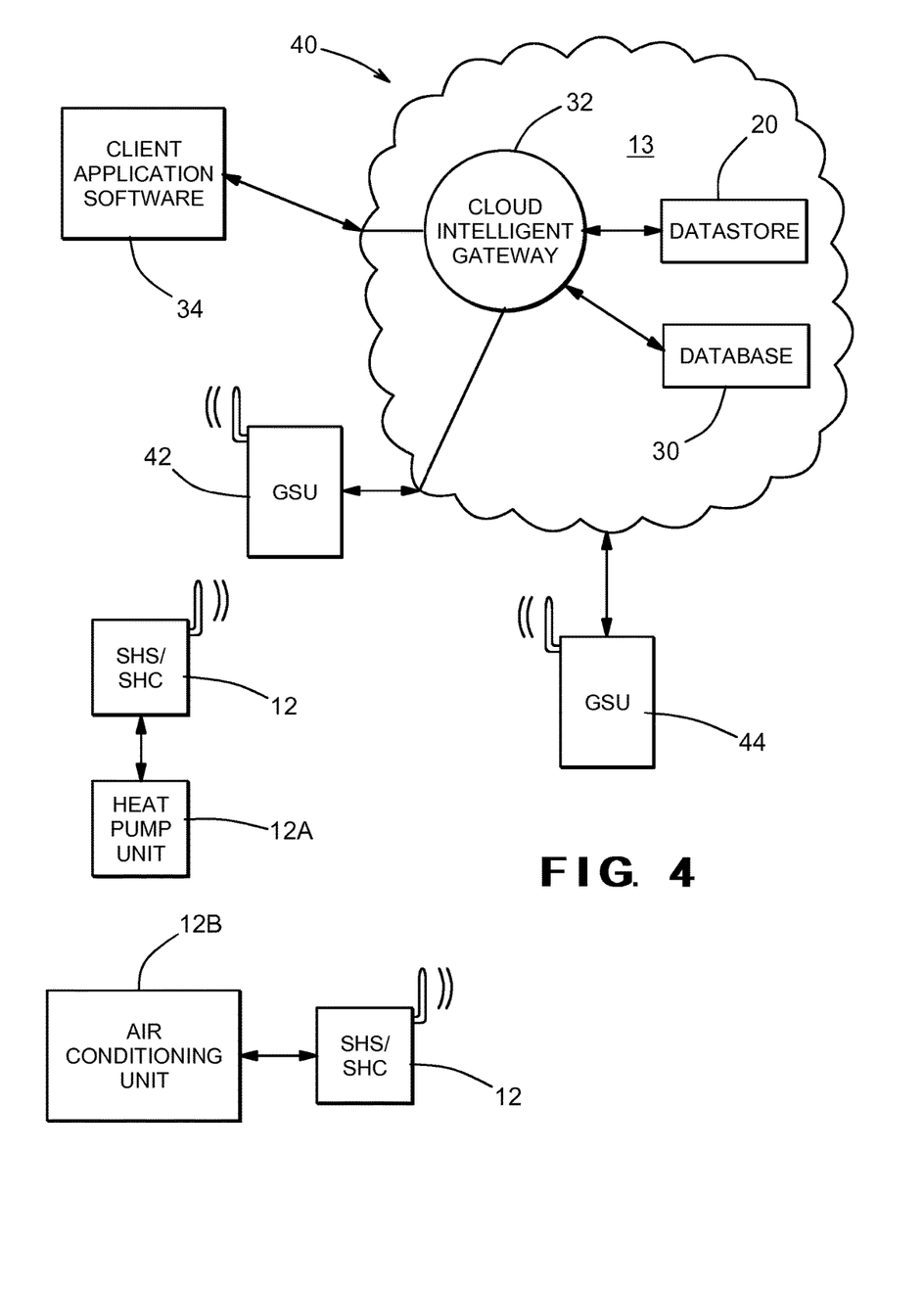
FIG. 4 is a diagrammatic view of a second embodiment of a control apparatus in accordance with this invention.
Figure 5:
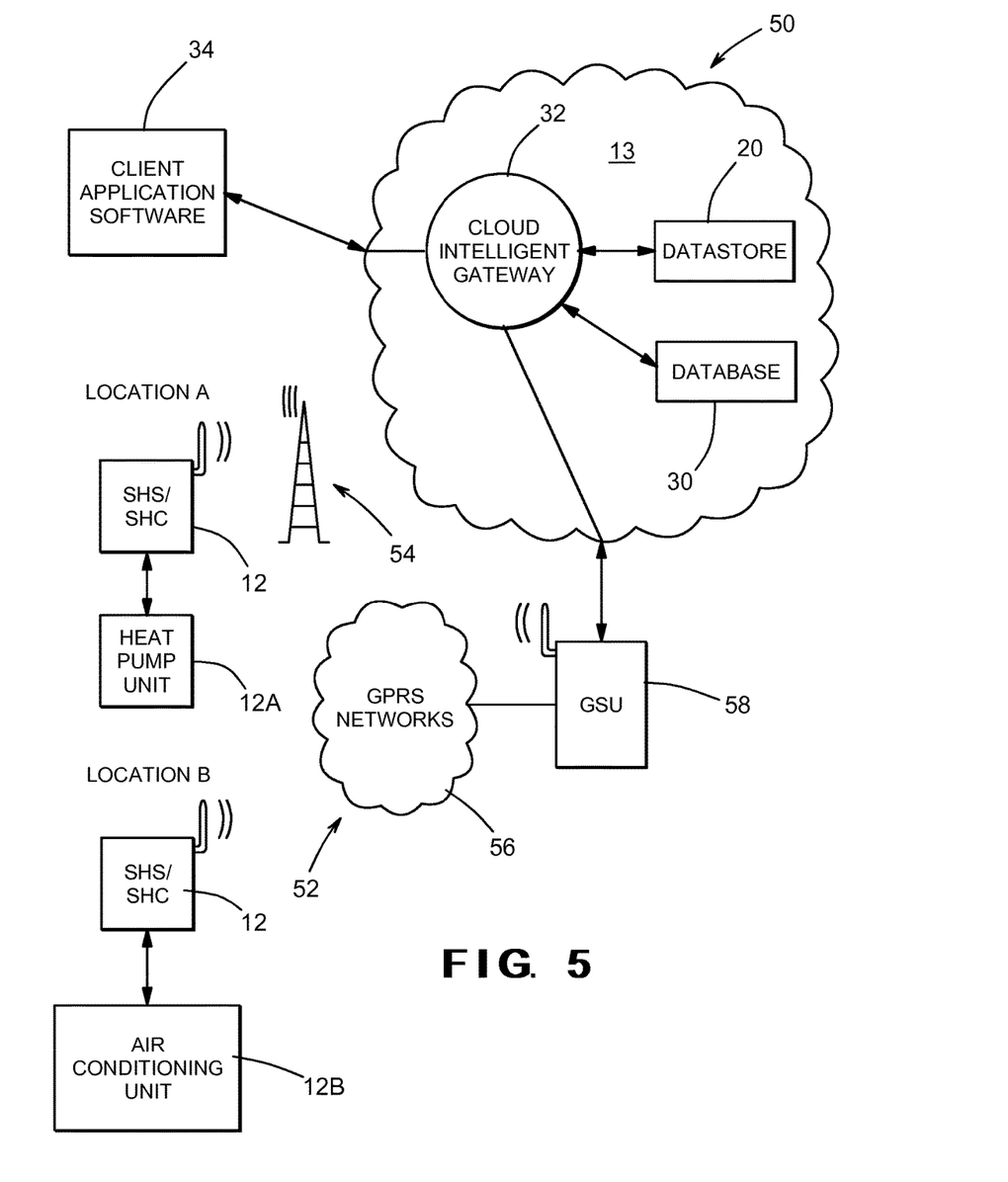
FIG. 5 is a diagrammatic view of a third embodiment of a control apparatus in accordance with this invention.

A third embodiment 50 of the invention is illustrated in FIG. 4, wherein like reference numbers are used to indicate components that are similar to those described and illustrated in connection with the first embodiment 10 of this invention. In the third embodiment 50, a cell phone infrastructure 52 is used instead of a local area network infrastructure, such as Wi-Fi. The cell phone infrastructure 52 includes a local cellular telephone tower 54 that receives and transmits signals from and to the intelligent controllers 12. The signals are transmitted through a general packet radio services (GPRS) network 56 and GSU 58 to the cloud intelligent gateway 32.

Although the various embodiments of this invention have been described and illustrated as including DunAn Microstaq intelligent controllers and microvalves, it will be appreciated that the invention also may practiced with other available controllers, valves, sensors, and similar devices. Additionally, while the system has been described as controlling HVAC/Refrigeration systems, the system also may be utilized to control other systems as well. Furthermore, it will be appreciated that components shown in each of the embodiments may also be utilized in the other embodiments. Thus, for example, it would be possible to use both a local intelligent gateway 16 to control selected end devices 12 and a GSU 42 to control other end devices in the same system (not shown).

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. An apparatus for controlling at least one heating, ventilation, air conditioning, or refrigeration (HVAC/R) system comprising:
    a microvalve;
    at least one intelligent controller;
    a local intelligent gateway in communication with the intelligent controller;
    a cloud computing network in communication with the local intelligent gateway; and
    a local device that is operative to communicate through the cloud computing network to the intelligent controller;
    the intelligent controller configured to:
        control one or more HVAC/R components;
        receive and monitor data from the microvalve and to use the data received from the microvalve to: provide the system health of the one or more HVAC/R components substantially instantaneously to an end user via the cloud computing network and the local device, sense the system health of the HVAC/R system, and send actions to adjust operating parameters of the one or more HVAC/R components automatically; and
        provide automatic services to an end user, including reports about the HVAC/R system health and the HVAC/R system performance, a history of actions taken, automatically generated ease-of-use billing services that can be accessed on any computer or handheld device.

2. The apparatus defined in claim 1 wherein the local device is also operative to control the local intelligent gateway.

3. The apparatus defined in claim 1 wherein the cloud computing network includes at least one storage unit for data being transferred between the local device and the intelligent controller.

4. The apparatus defined in claim 3 wherein the cloud computing network includes a cloud intelligent gateway in communication with the local intelligent gateway, the local device, and the at least one storage unit, wherein the cloud intelligent gateway is configured to perform one or more of the tasks of:

(1) communicating with the at least one storage unit to retrieve stored HVAC/R information,
(2) communicating with the one or more HVAC/R components through a local area network that provides communication between the intelligent controller and the local intelligent gateway to query the health of the HVAC/R system and rectify the health of the HVAC/R system,
(3) providing communication between a plurality of storage units in the cloud computing network, and
(4) providing a gateway for end-user applications that communicate with the HVAC/R components for services including one or more of monitoring, generating reports, and remotely controlling the intelligent controller.

5. The apparatus defined in claim 1 wherein the at least one intelligent controller is further configured to perform one or more of:
(1) improving and monitoring the system health of the one or more HVAC/R components,
(2) communicating wirelessly to the local intelligent gateway,
(3) responding to a variety of policies sent from service providers and adapting operating software in the one or more HVAC/R components, and
(4) controlling the microvalve.

6. The apparatus defined in claim 5 wherein the HVAC/R component is one of a heat pump unit and an air conditioning unit.

7. The apparatus defined in claim 5 wherein the microvalve is configured as a silicon expansion valve.

8. The apparatus defined in claim 1 wherein the local device is a computer.

9. The apparatus defined in claim 1 wherein the intelligent controller is a superheat controller.

10. The apparatus defined in claim 1 wherein the local intelligent gateway is configured to store the data from the microvalve in the local device when connectivity to the cloud computing network is not available, and further configured to upload the microvalve data stored in the local device to the cloud computing network when connectivity to the cloud computing network is again available.

11. The apparatus defined in claim 1 wherein the cloud computing network is configured to update software in the intelligent controller.

12. A method for controlling at least one heating, ventilation, air conditioning, or refrigeration (HVAC/R) system comprising the steps of:
providing a system comprised of:
  a microvalve;
  at least one intelligent controller;
  a local intelligent gateway in communication with the intelligent controller;
  a cloud computing network in communication with the local intelligent gateway; and
  a local device in communication with the cloud computing network;
entering an instruction for operation of the at least one HVAC/R system into the local device;
the intelligent controller configured to:
  control one or more HVAC/R components;
  receive and monitor data from the microvalve and to use the data received from the microvalve to: provide the system health of the one or more HVAC/R components substantially instantaneously to an end user via the cloud computing network and the local device, sense the system health of the HVAC/R system, and send actions to adjust operating parameters of the one or more HVAC/R components automatically; and
  provide automatic services to an end user, including reports about the HVAC/R system health and the HVAC/R system performance, a history of actions taken, automatically generated ease-of-use billing services that can be accessed on any computer or handheld device;
transferring the instruction from the local device to the cloud computing network; and
transferring the instruction from the cloud computing network to the intelligent controller.

13. The method defined in claim 12 wherein the cloud computing network transfers data from the intelligent controller to the local device.

14. The method defined in claim 13 wherein the one or more HVAC/R components are one or more of a heat pump unit and an air conditioning unit.

15. The method defined in claim 12 wherein the at least one intelligent controller is further configured to perform one or more of:
(1) improving and monitoring the system health of the one or more HVAC/R components,
(2) communicating wirelessly to the local intelligent gateway,
(3) responding to a variety of policies sent from service providers and adapting operating software in the one or more HVAC/R components, and
(4) controlling the microvalve.

16. The method defined in claim 12 wherein the intelligent controller is a superheat controller.

17. An apparatus for controlling a plurality of heating, ventilation, air conditioning, or refrigeration (HVAC/R) systems comprising:
a microvalve;
a plurality of intelligent controllers;
a local intelligent gateway in communication with the intelligent controllers in each of the plurality of HVAC/R systems;
a cloud infrastructure in communication with the local intelligent gateway; and
a local device that is operative to communicate through the cloud infrastructure to each intelligent controller in each of the plurality of HVAC/R systems;
the plurality of intelligent controllers provided in each of a plurality of HVAC/R systems, each intelligent controller configured to:
  control one or more HVAC/R components;
  receive and monitor data from the microvalve and to use the data received from the microvalve to: provide the system health of the one or more HVAC/R components substantially instantaneously to an end user via the cloud computing network and the local device, sense the system health of the HVAC/R system and send actions to adjust operating parameters of the one or more HVAC/R components automatically; and
  provide automatic services to an end user, including reports about the HVAC/R system health and the HVAC/R system performance, a history of actions taken, automatically generated ease-of-use billing services that can be accessed on any computer or handheld device;
a local intelligent gateway in communication with the intelligent controllers in each of the plurality of HVAC/R systems;

a cloud infrastructure in communication with the local intelligent gateway; and a local device that is operative to communicate through the cloud infrastructure to each intelligent controller in each of the plurality of HVAC/R systems.

18. The apparatus defined in claim 17 wherein the cloud infrastructure further includes at least one storage unit for data being transferred between the local device and the intelligent controller.

19. The apparatus defined in claim 18 wherein the cloud infrastructure further includes a cloud intelligent gateway in communication with the local intelligent gateway in each of the plurality of HVAC/R systems and the local device, and wherein the cloud intelligent gateway is configured to perform one or more of the tasks of:
  (1) communicating with the at least one storage unit to retrieve stored HVAC/R information from each of the plurality of HVAC/R systems,
  (2) communicating with the one or more HVAC/R components through a local area network in each of the plurality of HVAC/R systems, the local area network providing communication between the intelligent controllers and the local intelligent gateway to query the health of each HVAC/R system and rectify the health of each HVAC/R system,
  (3) providing communication between a plurality of storage units in the cloud infrastructure, and
  (4) providing a gateway for end-user applications that communicate with the HVAC/R components for services including one or more of monitoring, generating reports, and remotely controlling the intelligent controllers.

20. The apparatus defined in claim 17 wherein the intelligent controllers are further configured to perform one or more of:
  (1) improving and monitoring the system health of the one or more HVAC/R components,
  (2) communicating wirelessly to the local intelligent gateway,
  (3) responding to a variety of policies sent from service providers and adapting operating software in the one or more HVAC/R components, and
  (4) controlling the microvalve.

21. The apparatus defined in claim 20 wherein the one or more HVAC/R components are one or more of a heat pump unit and an air conditioning unit.

22. The apparatus defined in claim 20 wherein the cloud intelligent gateway of the cloud infrastructure is configured to simultaneously monitor and control the operation of the plurality of intelligent controllers in each of the plurality of HVAC/R systems, thus monitoring and controlling the one or more HVAC/R components associated with each intelligent controller via the local intelligent gateway in each of the plurality of HVAC/R systems.

23. The apparatus defined in claim 22 wherein the local device is a computer.

24. The apparatus defined in claim 20 wherein the microvalve is configured as a silicon expansion valve.

25. The apparatus defined in claim 17 wherein the intelligent controllers are superheat controllers.

\* \* \* \* \*